(12) United States Patent
Hampton et al.

(10) Patent No.: US 7,110,536 B2
(45) Date of Patent: Sep. 19, 2006

(54) ACOUSTIC SEAL SYSTEM

(75) Inventors: Patrick A. Hampton, Deerfield Beach, FL (US); Julio C. Castañeda, Coral Springs, FL (US); Robert T. Jamilla, West Palm Beach, FL (US)

(73) Assignee: Motorola, Inc., Schaumburg, IL (US)

( * ) Notice: Subject to any disclaimer, the term of this patent is extended or adjusted under 35 U.S.C. 154(b) by 302 days.

(21) Appl. No.: 10/608,323

(22) Filed: Jun. 27, 2003

(65) Prior Publication Data

US 2004/0264688 A1 Dec. 30, 2004

(51) Int. Cl.
*H04M 1/00* (2006.01)

(52) U.S. Cl. .......................... 379/433.02; 379/433.03; 379/420.02; 379/420.03; 381/345; 381/346; 455/575.1; 455/90.3

(58) Field of Classification Search ........... 379/433.02, 379/433.03, 420.02, 420.03; 381/346, 345; 455/575.1, 90.3
See application file for complete search history.

(56) References Cited

U.S. PATENT DOCUMENTS 4,799,264 A * 1/1989 Plummer .................... 381/346
6,321,070 B1 * 11/2001 Clark et al. .............. 455/575.1

* cited by examiner

*Primary Examiner*—Quynh H. Nguyen
(74) *Attorney, Agent, or Firm*—Larry G. Brown

(57) ABSTRACT

An acoustic seal system (100). The system (100) includes a flexible sealing element (110) having a ridge (134) for engaging a cover (118) with a sealing interference fit, a plate (112) in which the flexible sealing element (110) is secured to the plate (112) and a mesh (114) for controlling particle contamination. The mesh (114) is secured to the plate (112), and the plate (112) and at least a portion of the flexible sealing element (110) are secured to a portion of an inner housing (116). The portion of the flexible sealing element (110) engages the portion of the inner housing (116) with a sealing interference fit. When the cover (118) engages the inner housing (116), the flexible sealing element (110) provides an acoustic seal between the cover (118) and the inner housing (116).

14 Claims, 3 Drawing Sheets

ACOUSTIC SEAL SYSTEM

CROSS REFERENCE TO RELATED APPLICATIONS (Not Applicable)

BACKGROUND

1. Technical Field

This invention relates in general to audio systems and more particularly, to acoustic seals for such systems.

2. Description of the Related Art

There are several factors that may contribute to the degradation of the performance of an audio system. For example, when sound waves are being broadcast from a speaker, such sound may be dampened due to audio leakage, or the decibel loss of sound waves emitted from the speaker. In cases where audio leakage is high, it may become harder for a user to hear the audio that is being broadcast. Moreover, higher power levels may be required to boost an audio signal to overcome these losses. In addition to the audio leakage problem, dust or other airborne particulates may gather on the cone of a speaker in an audio system. This collection of particulates on the speaker cone may interfere with the cone's ability to vibrate, resulting in decreased audio performance.

In particular, many mobile communications units are susceptible to these performance-degrading factors. Specifically, mobile communications units are frequently exposed to the outside environment, where they often come into contact with a wide variety of airborne particulates. Moreover, speakers for mobile units are typically disposed within an internal housing in which a cover or bezel is placed over the housing. The space between the internal housing and the cover, however, may present several pathways where audio leakage can occur.

SUMMARY OF THE INVENTION

The present invention concerns an acoustic seal system. The system includes a flexible sealing element having a ridge for engaging a cover with a first sealing interference fit, a plate in which the flexible sealing element can be secured to the plate and a mesh for controlling particulate contamination. The mesh is secured to the plate, and the plate and at least a portion of the flexible sealing element are secured to a portion of an inner housing. In addition, the portion of the flexible sealing element engages the portion of the inner housing with a second sealing interference fit. Also, when the cover engages the inner housing, the flexible sealing element provides an acoustic seal between the cover and the inner housing.

In one arrangement, the plate can include at least one acoustic port for directing acoustic waves, and these acoustic ports can correspond to acoustic ports in the inner housing. Additionally, the flexible sealing element can include an opening. The opening can expose at least a portion of the plate and can be shaped to follow an outline of the acoustic ports of the plate. The flexible sealing element can have a top surface, and the ridge can be positioned on the top surface.

The plate can be secured to the portion of the inner housing with an adhesive. Moreover, the mesh can be secured to the plate with an adhesive. As an example, the flexible sealing element can be constructed of rubber or plastic, and the plate can be constructed of a rigid material. As another example, the rigid material can be metal.

In yet another arrangement, the inner housing can include a first cavity having a first cavity surface and a first cavity wall. Additionally, the flexible sealing element can include an edge. The edge can engage the first cavity wall with the second sealing interference fit, and the plate can be secured to the first cavity surface. A speaker can be secured to a second cavity surface of a second cavity of the inner housing with an adhesive, and the plate can at least partially direct acoustic waves emanating from the speaker. In addition, the flexible sealing element can be molded onto the plate.

The present invention also concerns another acoustic seal system. The system can include a flexible sealing element, a plate in which the flexible sealing element can be secured to the plate and a mesh. The mesh can control particulate contamination and can be secured to the plate. Further, the plate and at least a portion of the flexible sealing element can be secured to an inner housing. When the inner housing engages a cover, the flexible sealing element can also be secured to the cover thereby creating an acoustic seal between the inner housing and the cover.

BRIEF DESCRIPTION OF THE DRAWINGS

The features of the present invention, which are believed to be novel, are set forth with particularity in the appended claims. The invention, together with further objects and advantages thereof, may best be understood by reference to the following description, taken in conjunction with the accompanying drawings, in the several figures of which like reference numerals identify like elements, and in which:

DETAILED DESCRIPTION OF THE PREFERRED EMBODIMENT

Figure 1:
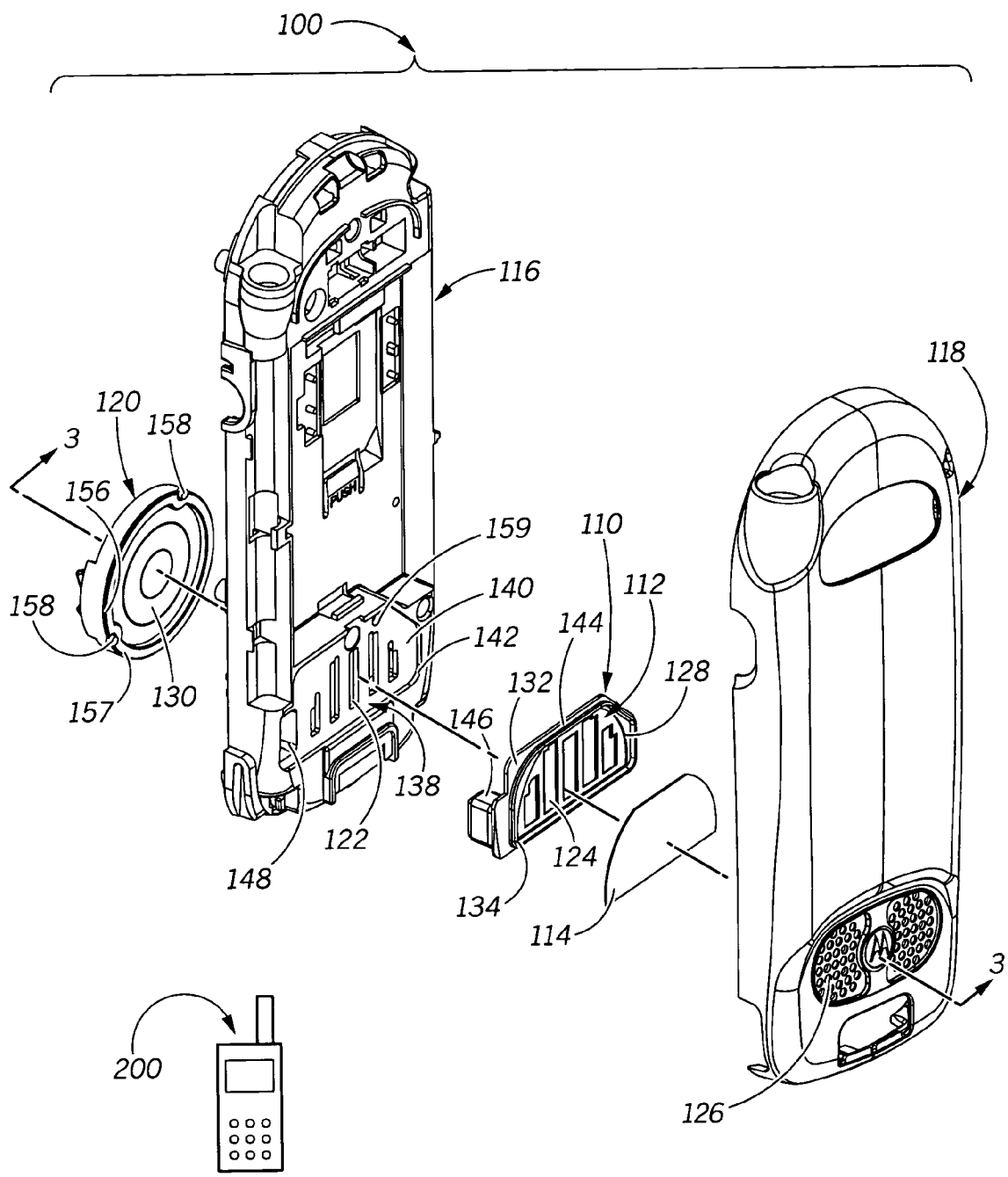
FIG. 1 illustrates a frontal view of an acoustic seal system in accordance with the inventive arrangements.

While the specification concludes with claims defining the features of the invention that are regarded as novel, it is believed that the invention will be better understood from a consideration of the following description in conjunction with the drawing figures, in which like reference numerals are carried forward.

Figure 2:
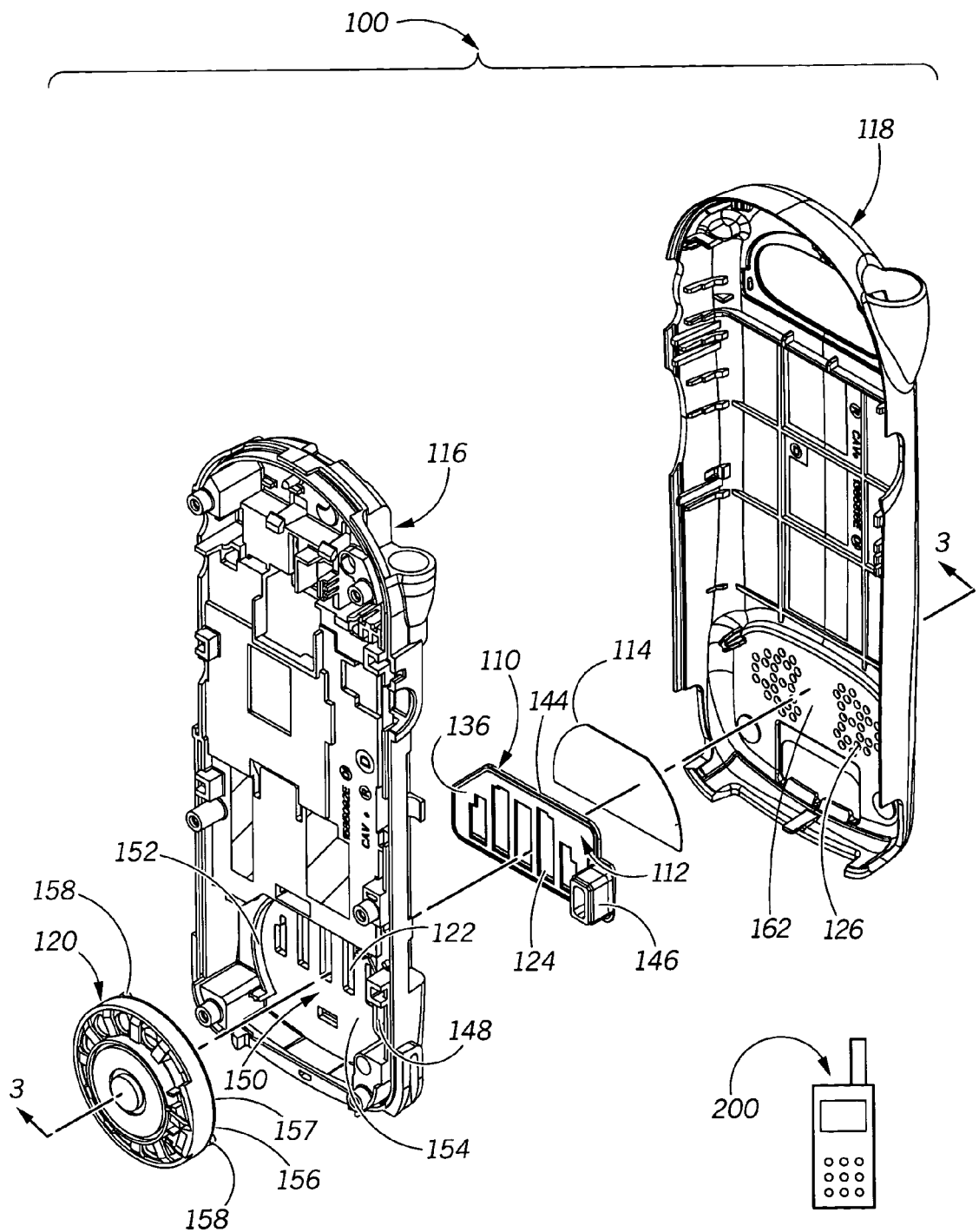
FIG. 2 illustrates a back view of the acoustic seal system in accordance with the inventive arrangements.

Referring to FIGS. 1 and 2, an exploded view of an acoustic sealing system 100 is shown. A frontal view of the system 100 is shown in FIG. 1, while a back view of the system 100 is illustrated in FIG. 2. The system 100 can include a flexible sealing element 110, a plate 112 and a mesh 114. The system 100 can also include an inner housing 116, a cover 118 (sometimes referred to as a bezel) and a speaker 120.

In one arrangement, the flexible sealing element 110, the plate 112, the mesh 114, the inner housing 116, the cover 118 and the speaker 120 can all be part of a telecommunications device 200. As an example, the telecommunications device 200 can be a dual communications mode mobile unit capable of supporting both cellular telephone service and dispatch service. In particular, the speaker 120 can be a speaker that can broadcast the audio associated with the operation of the dispatch service of the telecommunications device 200. It is understood, however, that the invention is not limited in this regard, as the components listed above can be part of any other suitable device that broadcasts audio.

The inner housing 116 can include one or more acoustic ports 122, and the plate 112 can include one or more acoustic ports 124 in which the acoustic ports 124 can correspond to the acoustic ports 122. That is, the acoustic ports 124 can be shaped to generally follow the outline of the acoustic ports 122. It is understood, however, that the invention is not so limited, as the acoustic ports 122, 124 can be configured into other suitable shapes. The cover 118 can also include one or more acoustic apertures 126. The acoustic ports 124, in addition to the acoustic ports 122, can be used to direct acoustic waves emanating from the speaker 120 to the acoustic apertures 126 of the cover 118 and on to the outside environment.

The flexible sealing element 110 can include an opening 128. As best shown in FIG. 1, the opening 128 can expose at least a portion of the plate 112 and can be shaped generally to follow an outline of the acoustic ports 124 of the plate 112. It must be noted, however, that the opening 128 is not limited to this particular shape, as the opening 128 can be in accordance with any other suitable configuration.

In one arrangement, the mesh 114 can be shaped to correspond to the configuration of the opening 128. The mesh 114 can be secured to the plate 112 with, for example, an adhesive. The mesh 114 can be constructed of any suitable material for preventing water, dust or other airborne particulates from passing through the acoustic ports 124 of the plate 112. If such particulates were permitted to pass through the acoustic ports 124 of the plate 112, they may collect on a cone 130 of the speaker 120, which can degrade the performance of the speaker 120.

The flexible sealing element 110 can be constructed of any flexible material, such as, but not limited to, rubber or plastic. In addition, the flexible sealing element 110 can be secured to the plate 112 (as is illustrated in FIGS. 1 and 2). As an example, the flexible sealing element 110 can be molded onto the plate 112. Referring to FIG. 1, the flexible sealing element 110 can include a top surface 132 and a ridge 134. The ridge 134 can be disposed on the top surface 132 and can, as will be explained later, permit the flexible sealing element 110 to engage the cover 118 with a sealing interference fit. In one arrangement, the ridge 134 can run at least substantially along the opening 128 of the flexible sealing element 110.

In another arrangement, the plate 112 can be constructed of a rigid material. For example, the rigid material may be constructed of metal. Positioning a plate 112 made of metal in accordance with the inventive arrangements may attenuate the magnetic field generated by the speaker 120. Reducing the strength of the magnetic field of the speaker 120 diminishes the possibility that a small metallic particle, partially metallic particle or ionically charged particle will be attracted to the magnetic field, which can supplement the filtering function of the mesh 114.

The plate 112 can be secured to the inner housing 116 with, for example, an adhesive. Specifically, as best shown in FIG. 2, the plate 112 can include a plate surface 136, and the inner housing 116, as best shown in FIG. 1, can include a first cavity 138 with a first cavity surface 140. An adhesive can be applied to either the plate surface 136 or the first cavity surface 140, and the plate 112 can be positioned inside the first cavity 138. The plate surface 136 can then bond to the first cavity surface 140.

In addition, a portion of the flexible sealing element 110 can also be secured to the inner housing 116. For example, the first cavity 138 can include a first cavity wall 142, and the flexible sealing element 110 can include an edge 144. Because the flexible sealing element 110 is made out of a flexible material, the edge 144 of the flexible sealing element 110 can be secured to the first cavity wall 142 of the inner housing 116 with a sealing interference fit. For purposes of the invention, a sealing interference fit can be any contact or mating between two or more elements in which there is deformation of at least one of the elements. This deformation can be temporary, a feature that can be provided by a flexible material, such as rubber.

Referring once again to both FIGS. 1 and 2, the flexible sealing element 110 can also include a projection 146. The projection 146 can plug a slot 148 located on the inner housing 116. As a result, the projection 146 can serve as an acoustic plug.

Referring to FIG. 2, the inner housing 116 can also include a second cavity 150 having a second cavity wall 152 and a second cavity surface 154. In addition, the speaker 120 can include a rim 156 that can at least substantially circumscribe the cone 130 (see also FIG. 1). A gasket 157 may also be secured to the rim 156. Referring to both FIGS. 1 and 2, the rim 156 can include one or more rim projections 158, and the projections 158 can be received by one or more corresponding apertures 159 (see FIG. 1). The projections 158, in conjunction with the apertures 159, can be used to align properly the speaker 120 in the second cavity 150.

Referring to FIG. 2, the second cavity wall 152 can be shaped to correspond to the configuration of the rim 156 to permit the speaker 120 to fit snugly in the second cavity 150. To secure the speaker 120 to the second cavity 150, an adhesive can be applied to the gasket 157 or the second cavity surface 154, and the speaker 120 can be positioned in the second cavity 150. The gasket 157 can then bond to the second cavity surface 154.

Referring to FIGS. 1 and 2, the inner housing 116 can engage the cover 118. As appreciated by those of ordinary skill in the art, the inner housing 116 and the cover 118 can include any suitable structure to permit the inner housing 116 to engage the cover 118. When the inner housing 116 engages the cover 118, the ridge 134 (see FIG. 1) of the flexible sealing element 110 can engage an inner surface 162 (see FIG. 2) of the cover 118 with a sealing interference fit.

Figure 3:
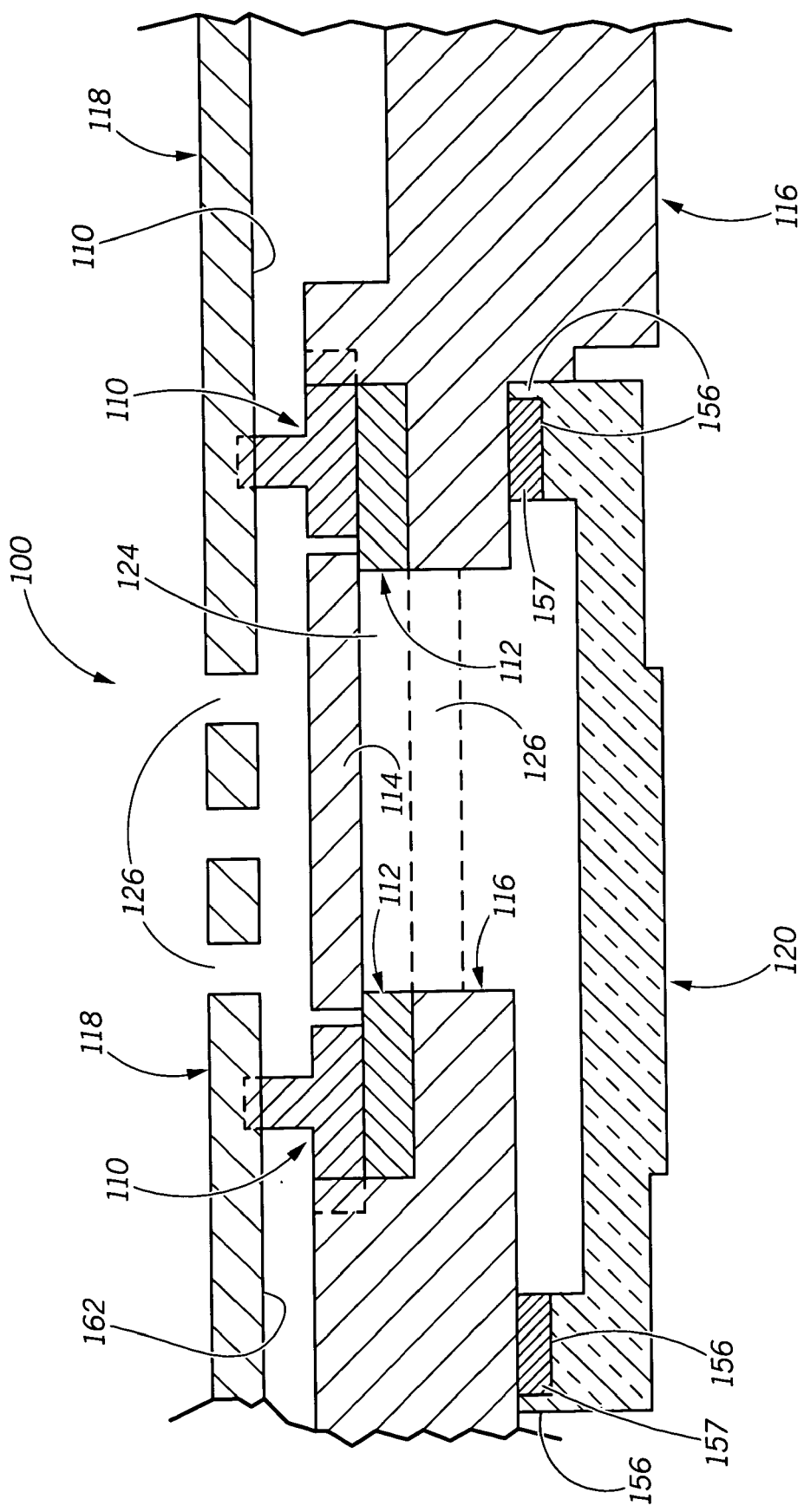
FIG. 3 illustrates a cross-sectional view of the acoustic seal system of FIGS. 1 and 2 in accordance with the inventive arrangements.

Referring to FIG. 3, a cross-sectional view of the system 100 is illustrated in which the line of sight follows reference line 3—3 shown in FIGS. 1 and 2. As shown, the speaker 120 is secured to the inner housing 116 through the gasket 157 (sitting on the rim 156), and the plate 112 and the flexible sealing element 110 are also secured to the inner housing 116. The sealing interference fit between the inner housing 116 and the flexible sealing element 110 is represented by the portion of the flexible sealing element 110 that is illustrated with a broken outline. In addition, the mesh 114 is secured to the plate 112, and the cover 118 is engaged with the inner housing 116. The sealing interference fit between the inner surface 162 of the cover 118 and the flexible sealing element 110 is shown as well, which is also represented by a broken outline.

Audio that emanates from the speaker 120 passes through the acoustic ports 122, 124 (represented by the broken outlines), the mesh 114 and finally the acoustic apertures 126 of the cover 118. As shown here, when the flexible sealing element 110 is secured to the inner housing 116 and the cover 118 is engaged with the inner housing 116, the flexible sealing element 110 provides an acoustic seal between the inner housing 116 and the cover 118. This configuration also can help direct acoustic waves to the outside environment and may prevent airborne particulates, particularly those attracted by a speaker's magnetic field, from collecting on sensitive components.

While the preferred embodiments of the invention have been illustrated and described, it will be clear that the invention is not so limited. Numerous modifications, changes, variations, substitutions and equivalents will occur to those skilled in the art without departing from the spirit and scope of the present invention as defined by the appended claims.

What is claimed is:

1. An acoustic seal system, comprising:
   a flexible sealing element having a ridge for engaging a cover with a first sealing interference fit;
   a plate, wherein said flexible sealing element is secured to said plate; and
   a mesh for controlling particulate contamination, wherein said mesh is secured to said plate;
   wherein said plate and at least a portion of said flexible sealing element are secured to a portion of an inner housing, said portion of said flexible sealing element engages the portion of the inner housing with a second sealing interference fit;
   wherein when the cover engages the inner housing, said flexible sealing element provides an acoustic seal between the cover and the inner housing.

2. The system according to claim 1, wherein said plate includes at least one acoustic port for directing acoustic waves, said acoustic ports corresponding to acoustic ports in the inner housing.

3. The system according to claim 2, wherein said flexible sealing element includes an opening, said opening exposing at least a portion of said plate and shaped to follow an outline of said acoustic ports of said plate.

4. The system according to claim 1, wherein said flexible sealing element has a top surface, said ridge being positioned on said top surface.

5. The system according to claim 1, wherein said plate is secured to the portion of the inner housing with an adhesive.

6. The system according to claim 1, wherein said mesh is secured to said plate with an adhesive.

7. The system according to claim 1, wherein said flexible sealing element is constructed of at least one of rubber and plastic.

8. The system according to claim 1, wherein said plate is constructed of a rigid material.

9. The system according to claim 8, wherein said rigid material is metal.

10. The system according to claim 1, wherein the inner housing includes a first cavity having a first cavity surface and a first cavity wall.

11. The system according to claim 10, wherein said flexible sealing element includes an edge, said edge engaging the first cavity wall with the second sealing interference fit, wherein said plate is secured to the first cavity surface.

12. The system according to claim 1, wherein a speaker is secured to a second cavity surface of a second cavity of the inner housing with an adhesive and wherein said plate at least partially directs acoustic waves emanating from the speaker.

13. The system according to claim 1, wherein said flexible sealing element is molded onto said plate.

14. An acoustic seal system, comprising:
    a flexible sealing element;
    a plate, wherein said flexible sealing element is secured to said plate; and
    a mesh for controlling particulate contamination, wherein said mesh is are secured to said plate;
    wherein said plate and at least a portion of said flexible sealing element are secured to an inner housing;
    wherein when the inner housing engages a cover, said flexible sealing element is also secured to the cover thereby creating an acoustic seal between the inner housing and the cover.

* * * * *